(12) United States Patent
Yen et al.

(10) Patent No.: US 9,080,112 B2
(45) Date of Patent: Jul. 14, 2015

(54) FILTRATION METHOD FOR REFINING AND CHEMICAL INDUSTRIES

(75) Inventors: Ping-Wen Yen, Taipei (TW); Yuh-Sheve Ho, Taipei (TW); Hung-Tzu Chiu, Taipei (TW); Chung-Jong Hwu, Taipei (TW); June-Cheng Chang, Taipei (TW); Tzong-Bin Lin, Taipei (TW); Tsoung Y. Yan, Philadelphia, PA (US); Cheng-Tsung Hong, Taipei (TW); Hung-Chung Shen, Taipei (TW); Jeng-Cheng Lee, Taipei (TW); Fu-Ming Lee, Katy, TX (US)

(73) Assignee: CPC Corporation, Taiwan, Taipei (TW)

( * ) Notice: Subject to any disclaimer, the term of this patent is extended or adjusted under 35 U.S.C. 154(b) by 480 days.

(21) Appl. No.: 13/470,340

(22) Filed: May 13, 2012

(65) Prior Publication Data
US 2012/0228231 A1    Sep. 13, 2012

Related U.S. Application Data

(60) Division of application No. 12/589,314, filed on Oct. 21, 2009, now abandoned, and a continuation-in-part of application No. 12/112,623, filed on Apr. 30, 2008, now abandoned.

(51) Int. Cl.
*B01D 35/06* (2006.01)
*B03C 1/30* (2006.01)
(Continued)

(52) U.S. Cl.
CPC ............. *C10G 21/28* (2013.01); *B01D 29/23* (2013.01); *B01D 35/06* (2013.01); *B03C 1/0332* (2013.01); *B03C 1/286* (2013.01); *B03C 1/30* (2013.01); *C10G 25/003* (2013.01); *C10G 31/09* (2013.01); *C10G 32/02* (2013.01); *B03C 2201/18* (2013.01); *B03C 2201/20* (2013.01); *B03C 2201/28* (2013.01)

(58) Field of Classification Search
CPC ........ C10G 21/28; C10G 31/09; C10G 32/02; B01D 35/06; B01D 29/33; B03C 1/032; B03C 1/0332; B03C 1/284; B03C 1/286; B03C 1/288; B03C 1/30; B03C 2201/18; B03C 2201/20; B03C 2201/28
USPC ........................................... 210/222, 223, 695
See application file for complete search history.

(56) References Cited

U.S. PATENT DOCUMENTS 2,385,431 A * 9/1945 Vose .............................. 208/284
2,459,534 A * 1/1949 Kennedy ....................... 210/223
(Continued)

FOREIGN PATENT DOCUMENTS

DE    19717869 A1 * 12/1997

*Primary Examiner* — David C Mellon
(74) *Attorney, Agent, or Firm* — Cascio & Ziervas

(57) ABSTRACT

A novel design of filters for removing iron rust particulates and other polymeric sludge from refinery and chemical process streams that are paramagnetic in nature is provided. The performance of these filters is greatly enhanced by the presence of the magnetic field induced by magnets. Basically, the filter comprises a high-pressure vessel with means to support the plurality of magnets in the form of bars or plates that are encased in stainless steel tubes or columns. Filters with various configurations are disclosed for accommodating the removal of contaminants from the process streams of different industries, with high efficiency for contaminants removal, simple construction, low operational and maintenance costs, and low hazardous operation.

16 Claims, 6 Drawing Sheets

(51) Int. Cl.
*C10G 21/28* (2006.01)
*B01D 29/23* (2006.01)
*B03C 1/033* (2006.01)
*B03C 1/28* (2006.01)
*C10G 25/00* (2006.01)
*C10G 31/09* (2006.01)
*C10G 32/02* (2006.01)

(56) References Cited

U.S. PATENT DOCUMENTS

| | | | | |
|---|---|---|---|---|
| 3,143,496 A | * | 8/1964 | Maretzo | 210/791 |
| 3,195,728 A | * | 7/1965 | Sommermeyer | 210/223 |
| 3,448,040 A | * | 6/1969 | Little et al. | 585/319 |
| 4,067,810 A | * | 1/1978 | Sullivan | 210/223 |
| 4,298,456 A | * | 11/1981 | Coombs et al. | 208/86 |
| 4,619,770 A | * | 10/1986 | Boston | 210/772 |
| 4,764,278 A | * | 8/1988 | Chou et al. | 210/634 |
| 4,783,266 A | * | 11/1988 | Titch et al. | 210/695 |
| 4,944,917 A | * | 7/1990 | Madden et al. | 422/13 |
| 4,946,589 A | * | 8/1990 | Hayes | 210/222 |
| 5,043,063 A | * | 8/1991 | Latimer | 210/222 |
| 5,188,239 A | * | 2/1993 | Stowe | 209/223.1 |
| 5,571,408 A | * | 11/1996 | Rising | 210/167.29 |
| 5,637,226 A | * | 6/1997 | Adam et al. | 210/695 |
| 7,879,225 B2 | * | 2/2011 | Lee et al. | 208/313 |
| 2004/0182769 A1 | * | 9/2004 | Fogel et al. | 210/222 |
| 2007/0068862 A1 | * | 3/2007 | Sisemore | 210/222 |
| 2009/0255853 A1 | * | 10/2009 | Lee et al. | 208/312 |

* cited by examiner

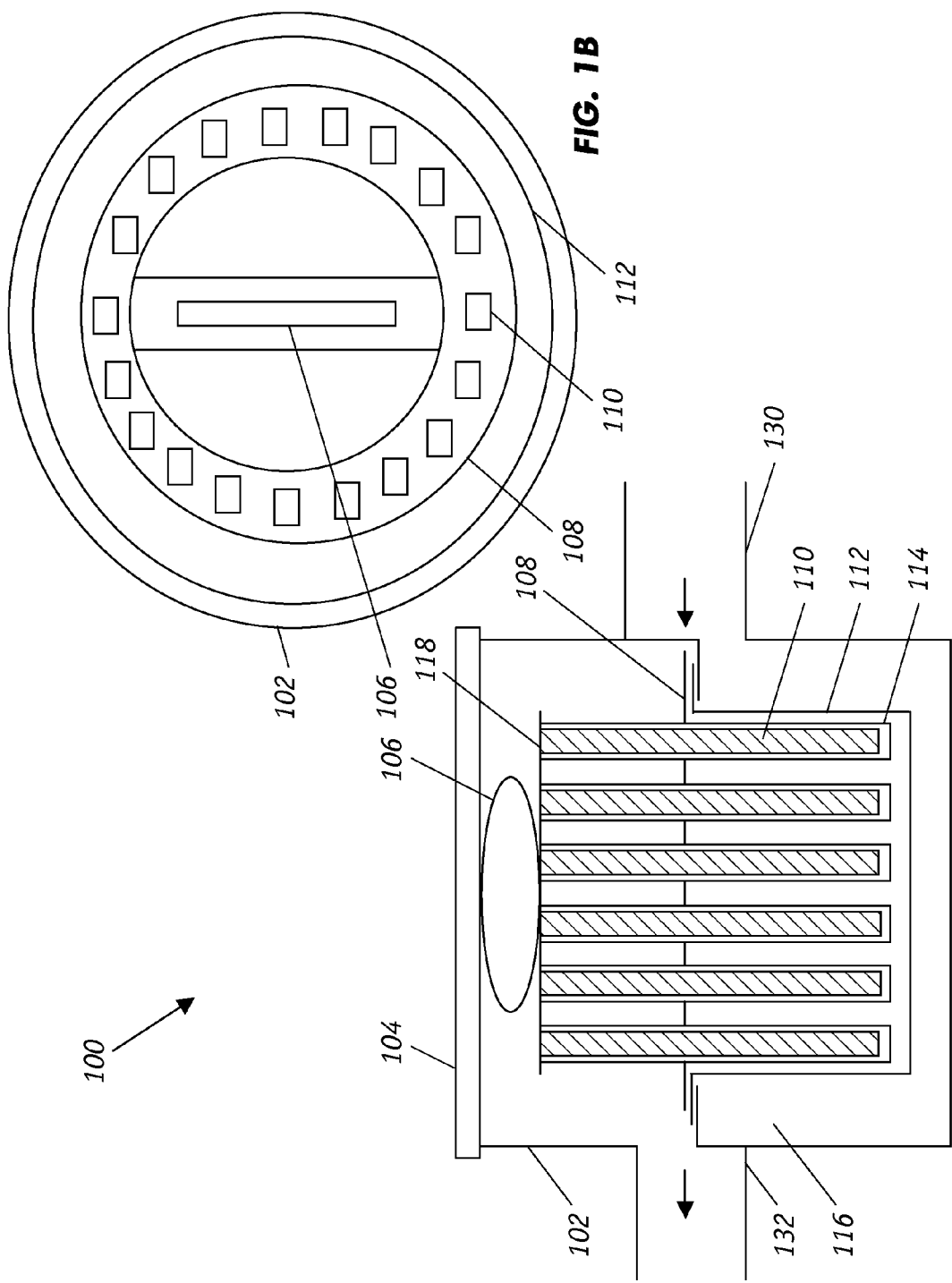

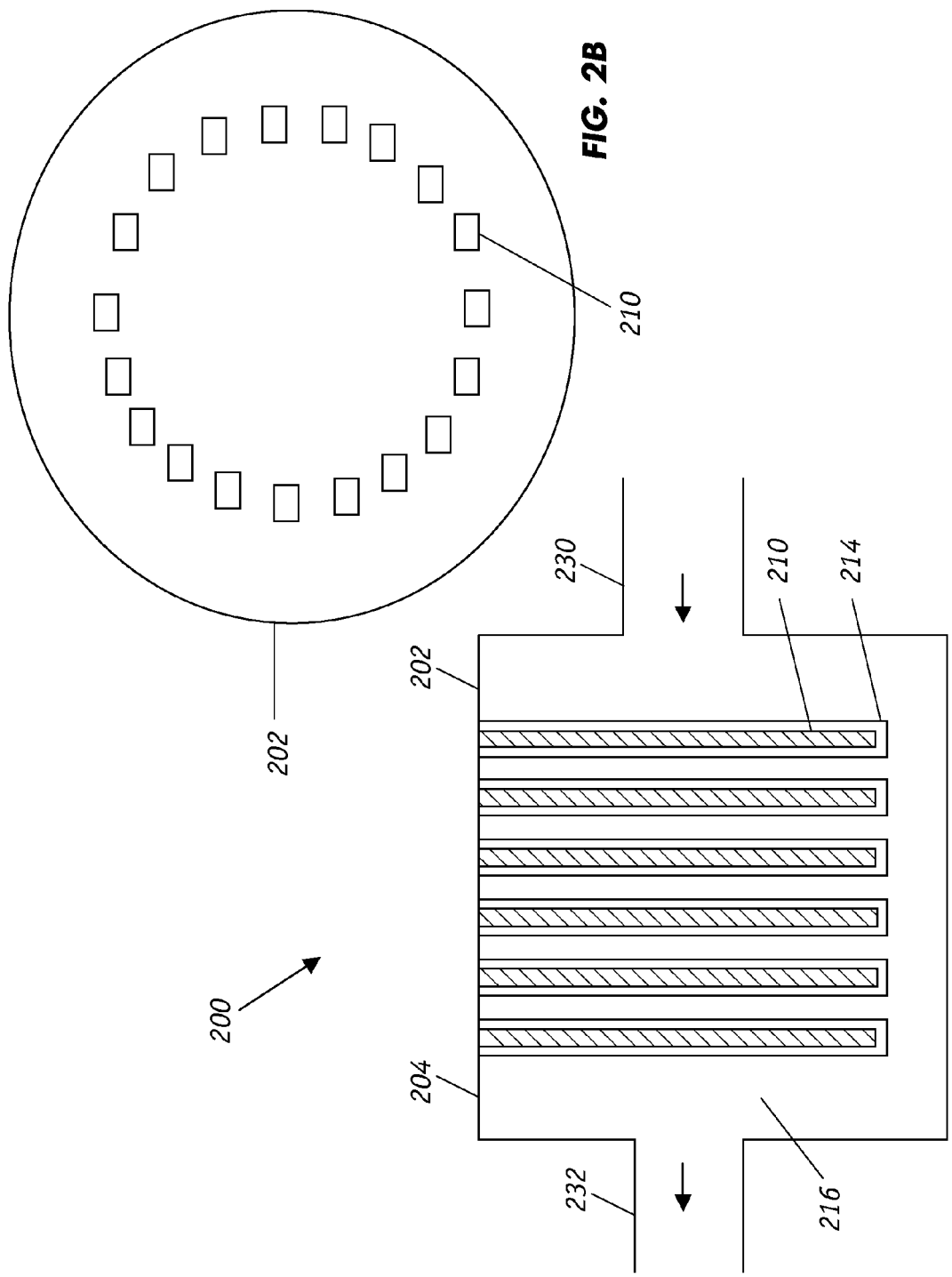

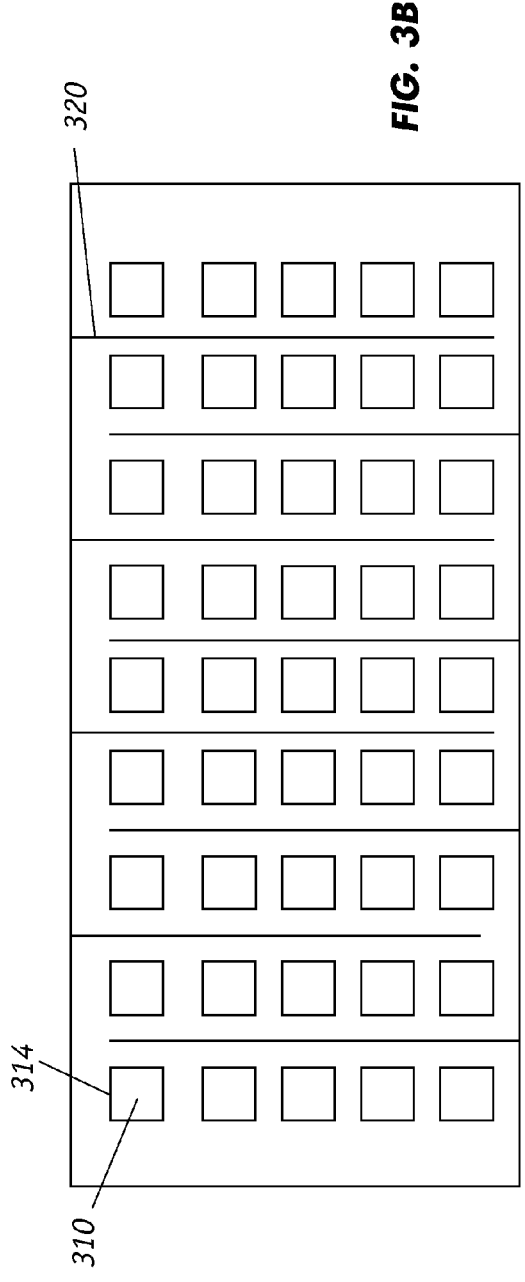
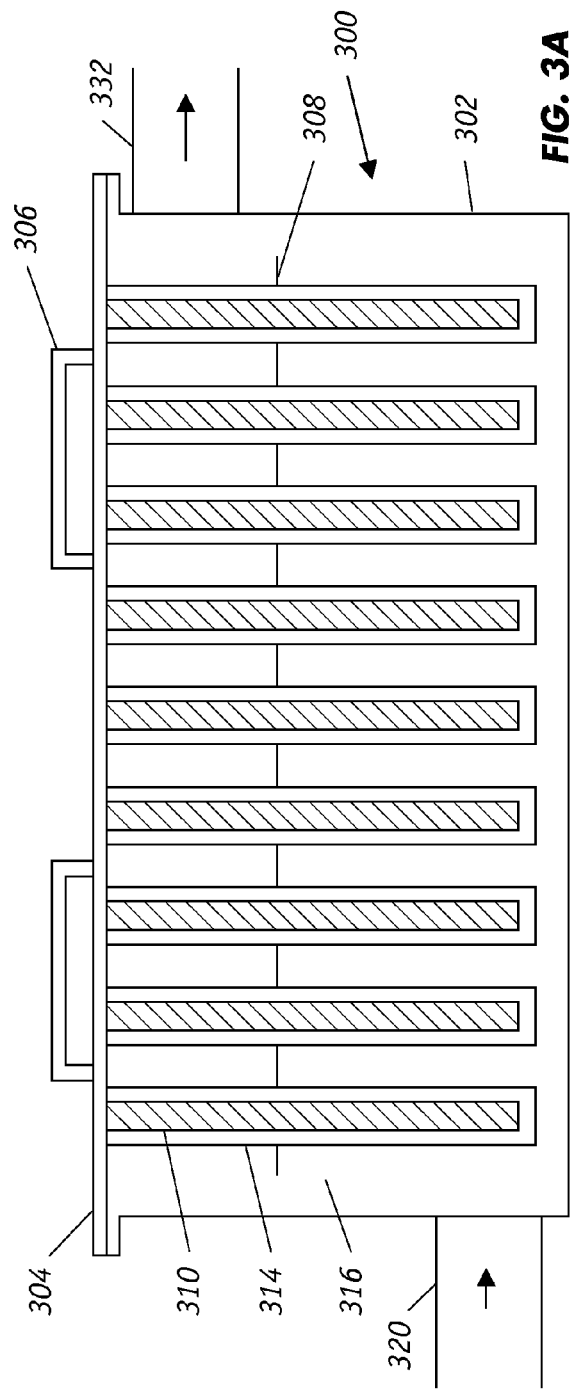

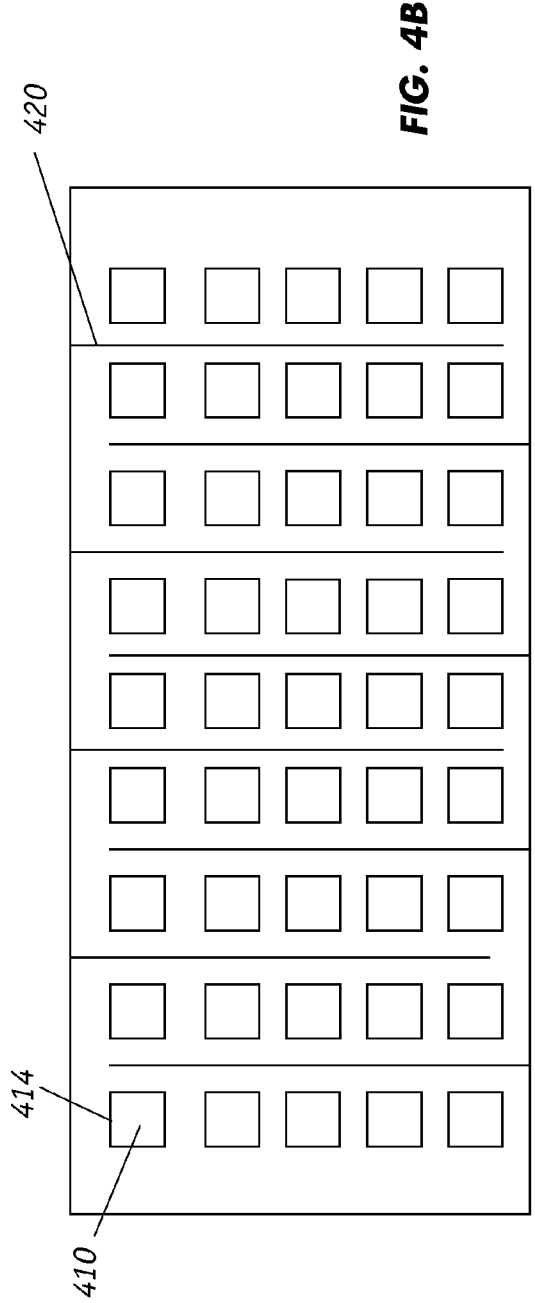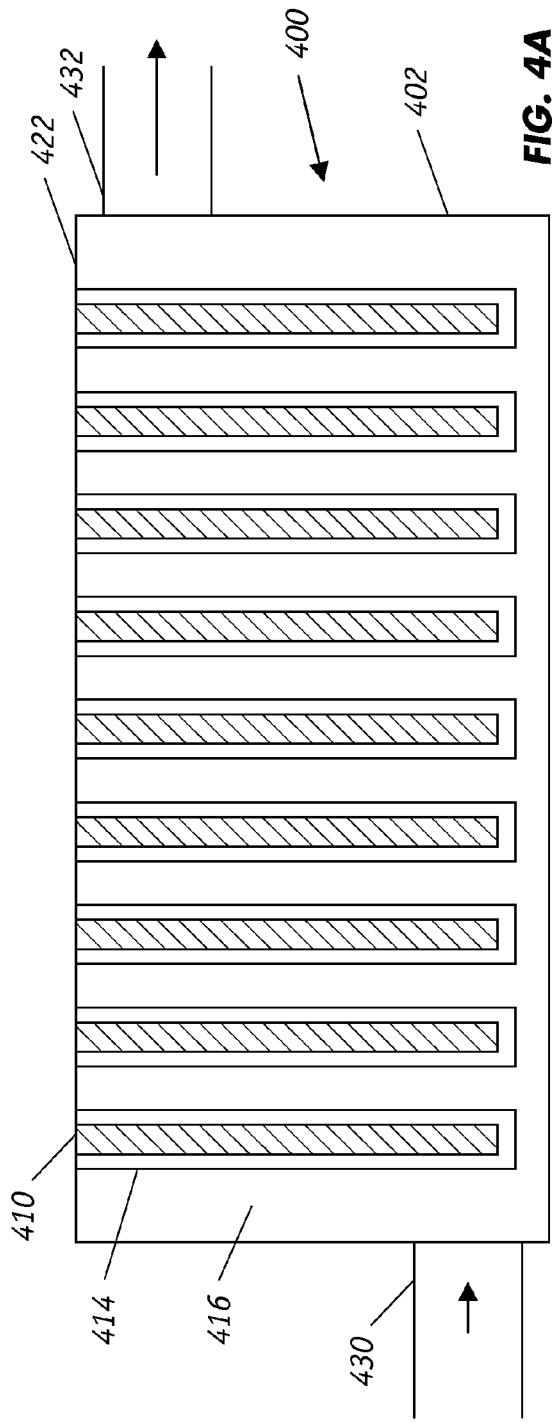

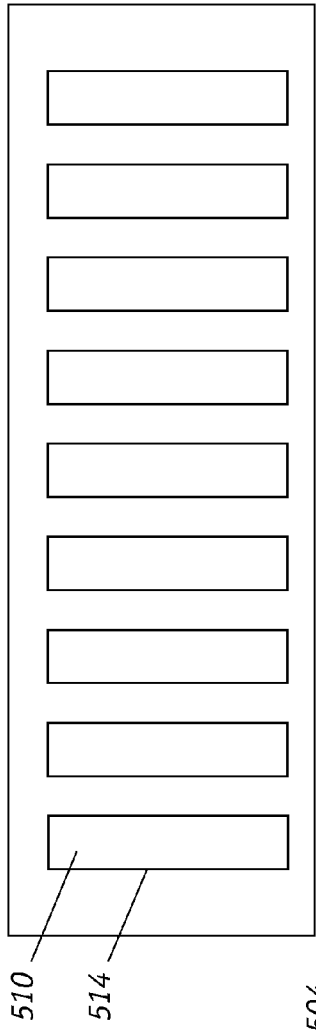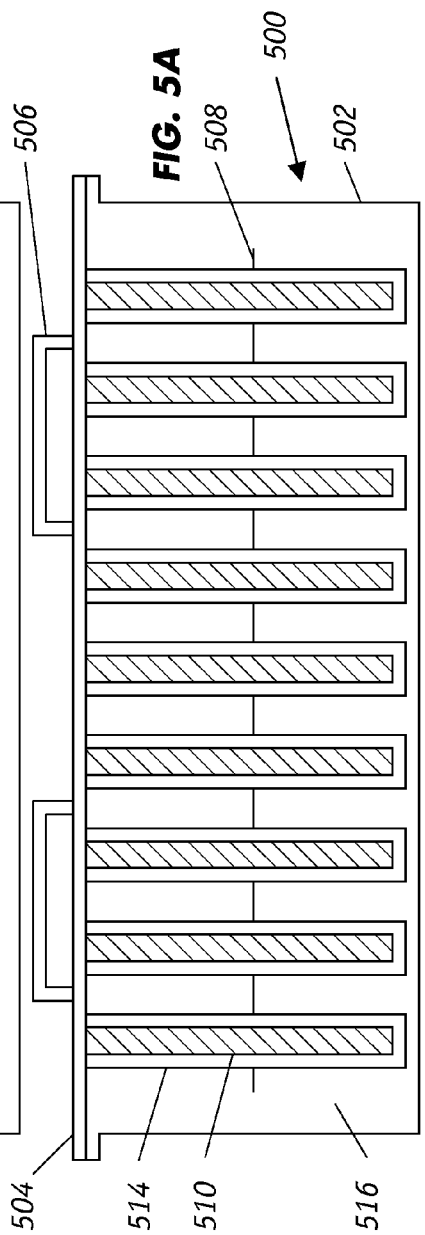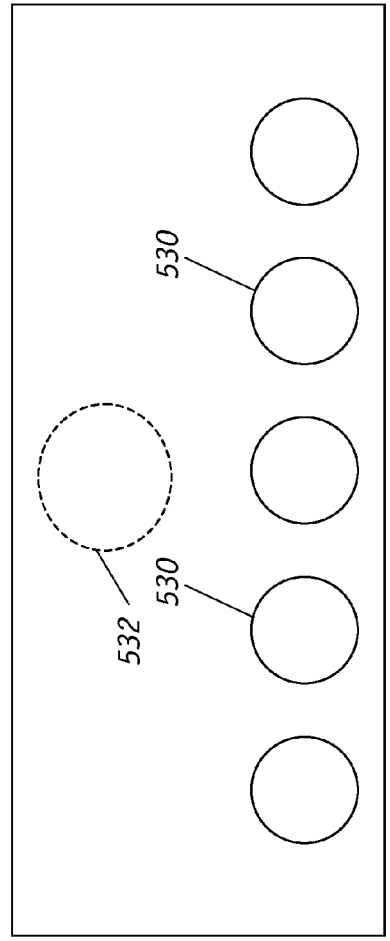

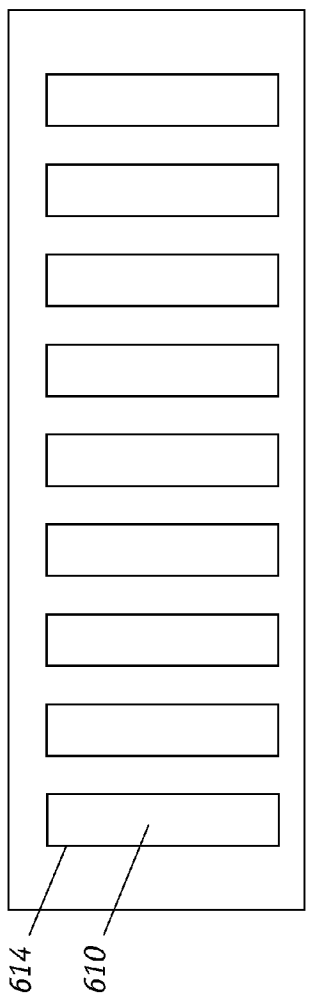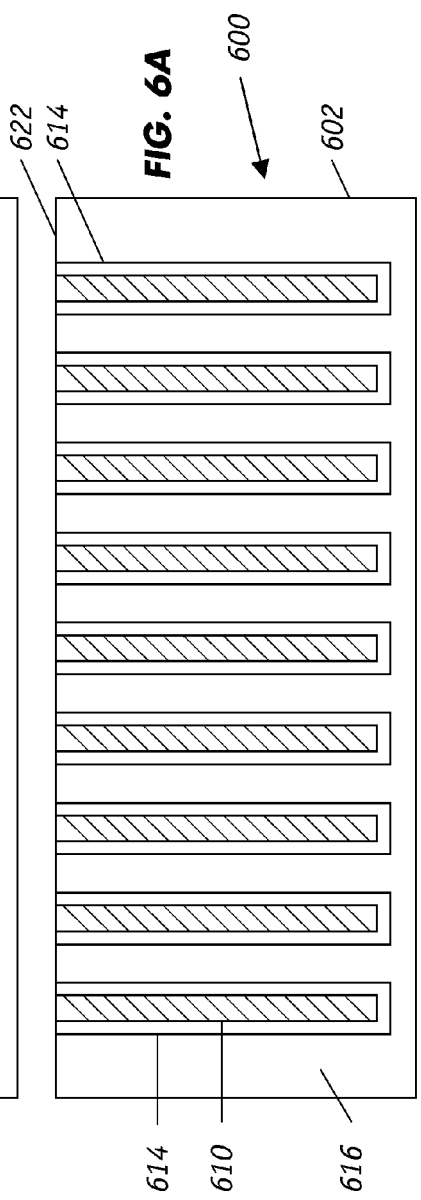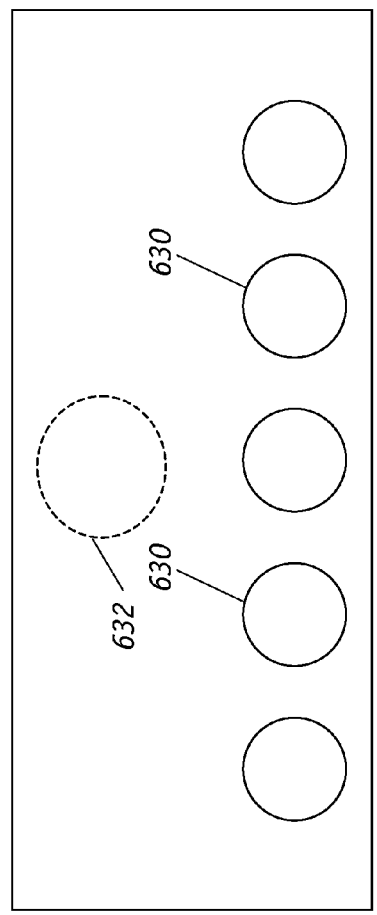

FILTRATION METHOD FOR REFINING AND CHEMICAL INDUSTRIES

REFERENCE TO RELATED APPLICATIONS

This application is divisional application of application Ser. No. 12/589,314 that was filed on Oct. 21, 2009 now abandoned. Application Ser. No. 12/589,314 was a continuation-in-part application of application Ser. No. 12/112,623 that was filed on Apr. 30, 2008, now abandoned.

BACKGROUND OF THE INVENTION

Process streams in refineries are often contaminated with components that are detrimental to down-stream process units and/or are corrosive to the process equipment, or they are contaminated with solid matter, such as iron rust, which tends to interfere with process lines, valves, and pumps. The contaminants must be removed before the streams enter certain parts of the process or process units in order to maintain the process or unit performance. A filtration screen, filter housing or cartridge containing adsorbents or filtration media is usually placed in front of the process unit to remove the bulk of the undesirable matters. For example, a RONNING-PETTER multiplex filter is used to remove solid matters from atmospheric distillation residual oil before it is fed to a hydrotreater at temperatures around 200° C. Tri-cluster elements are installed in the filter to increase the filtration area. A drawback of these filtration devices is that they can be overwhelmed by large quantities of solid matters and iron rust from corrosion in a short time. As a result, processes streams frequently bypass such filtration devices as contaminant build-up cause operational problems, such as increased pressures and/or reduced flow rates. In addition, rejuvenation of conventional filtration devices requires their disassembly replacement of the filter element, which is a costly, time-consuming, and environmentally hazardous task.

Process streams in chemical plants are generally cleaner than those of refineries in terms of solid matters, but chemical streams usually contain polar components that polymerize to form solid sludge, or decompose to form more active species that cause corrosion or related problems. Activated carbon is frequently used as the adsorbent to remove the active species from the process stream. U.S. Pat. No. 4,861,900 to Johnson describes the use of activated carbon to remove small amounts of compounds that are catalyst poisons in the catalytic hydrogenation of sulfolenes to sulfolanes.

Similarly, U.S. Pat. No. 3,470,087 to Broughton describes a technique for removing polar solvent from a hydrocarbon product stream through an adsorption cycle with activated carbon and thereafter, recovering the adsorbed solvent through a desorption cycle. It has been demonstrated that adsorption-desorption arrangements with activated carbon is impractical because these units become quickly saturated with solid sludge or fine rust particles that strongly adheres to adsorbent thereby making the units difficult to clean. Other adsorbents, such alumina, silica gel and zeolitic materials have also been employed to remove polar matters from process streams. For example, U.S. Pat. No. 3,953,324 to Deal describes a method of adsorbing polar solvent with silica gel from a product stream at low temperatures and then flashing a feed mixture at higher temperatures in order to recover the adsorbed solvent from silica gel. This method encounters that same problems attendant with adsorption-desorption methods using activated carbon.

A method for removing both suspended particulate matter, such as iron rust, as well as dissolved ionic and polar impurities from a process stream is described in U.S. Pat. No. 5,053,137 to Lal. The technique entails passing a contaminated solvent, sulfolane, through a pair of columns that are arranged in series, with the first column containing cation exchanger resin and the second containing anion exchanger resin. Although this method is effective, it is not commercially feasible because only small amounts of solvent can be cleaned due to limited capacity of the ion-exchanger resins. Moreover, the procedure produces a large quantity of hazardous waste. Finally, a method that combines filtration, adsorption, and ion exchange for removing the contaminants from a liquid stream is disclosed U.S. Pat. No. 3,985,648 to Casolo. Unfortunately, the system is complex in both process design and implementation because process requires multiple ion-exchange columns, including both cation and anion exchangers, and adsorption columns.

Therefore, there is a need in the refining and chemical industries for efficient, safe, and easily regenerable filters that are particularly suited for removing contaminants that include (i) solid materials, (ii) polymerized sludge that is generated by actives in the process streams, and/or (iii) iron rust that is generated by corrosive species that attack various materials used in refining and chemical process equipment.

SUMMARY OF THE INVENTION

This invention is directed novel filters that employ magnets for removing iron rust particulates and polymeric sludge, which are paramagnetic in nature, from refinery and chemical process streams. The performance of these filters is attributable to the presence of the magnetic fields that are induced by the magnets. The invention is based in part on the recognition that carbon steel, a common material in plant construction, is readily corroded by acidic components prevalent in process streams. The corrosion causes the formation of ferrous ions, which in turn react with sulfur, oxygen and water to form paramagnetic FeS, FeO, $Fe(OH)_2$, $Fe(CN)_6$, etc. that manifest as fine particles or visible flakes. These paramagnetic materials will attract other degradation sludge, making the whole mass of contaminants paramagnetic. Consequently, the entire mass of the contaminants can be readily removed from the process stream with the magnet filter device of the present invention.

In one aspect, the invention is directed to a filtration apparatus for continuous online removal of contaminants from a process stream that comprises: (i) a pressure vessel that has a compartment, (ii) at least one magnet that is positioned within the compartment; and means for channeling the flow of the process stream containing contaminants pass the at least one magnet. Each magnet is preferably encased in housing that is made of stainless steel or other suitable corrosive resistant material. The housing can be integral with the vessel. The housing exterior, which is in contact with the process stream, serves as an adsorptive surface to which contaminants adhere. The inventive filtration apparatus can be readily scaled and configured to accommodate different operating conditions in order to minimize downtime and hazardous operations.

BRIEF DESCRIPTION OF THE DRAWINGS

FIGS. 1A and 1B illustrate cross sectional side and top views, respectively, of a filtration device with housing in the form of removable adsorptive tubes for low solid matters removal;

FIGS. 2A and 2B illustrate cross sectional side and top views, respectively, of a filtration device with housing in the form of non-removable adsorptive tubes for low solid matters removal;

FIGS. 3A and 3B illustrate cross sectional side and top views, respectively, of a filtration device with housing in the form of removable adsorptive tubes for high solid matters removal;

FIGS. 4A and 4B illustrate cross sectional side and top views, respectively, of a filtration device with housing in the form of non-removable adsorptive tubes for high solid matters removal;

FIGS. 5A, 5B and 5C illustrate cross sectional side, top, and front views, respectively, of a filtration device with housing in the form removable adsorptive slates for high solid matters removal; and FIGS. 6A, 6B and 6C illustrate cross sectional side, top and front views, respectively, of a filtration device with housing in the form of non-removable adsorptive slates for high solid matters removal.

DETAILED DESCRIPTION OF THE PREFERRED EMBODIMENTS

Filtration devices of the present invention are particularly effective in removing contaminants from process streams. One source of the contaminants is the corrosion of process equipment and another source is the presence of active species in the process streams that ultimately lead to the formation of polar polymeric sludge. It has been demonstrated that these contaminants are paramagnetic in nature and therefore are attracted to magnets. The contaminants generally comprise a mixture of different materials are acidic, low in pH, black and viscous, and tend to deposit throughout the process lines, including filters, heat exchangers, catalyst beds, thereby reducing process capacity and efficiency. Since most process equipment in the refining and chemical industries is made from carbon steel that is susceptible to corrosion by the acidic substances in the process streams, the contaminants are generated by oxidation due to air leakage in the system as well as by the chlorinated additives especially at elevated temperature and pressure operating conditions. It is believed that when carbon steel is corroded by acidic substances, the ferrous ions released react with sulfur, oxygen and water to create paramagnetic $FeS$, $FeO$, $Fe(OH)_2$, $Fe(CN)_6$, etc. in the form of fine particles or visible flakes. These paramagnetic materials may attract other degradation sludge, making the whole mass of the contaminants paramagnetic. Consequently, the entire mass of the contaminants can be continuously removed from a process stream with a filtration apparatus that is equipped with magnets.

Magnetic intensity is temperature dependent. High temperatures can lead to a reduction in the magnetic field strength so it is preferable to avoid excessive operating temperatures which would rendering the filtration apparatus less efficient. Conversely, low temperatures operations are to be avoid especially during the cleaning stage otherwise, the paramagnetic matters will adhere to the stainless steel adsorptive housing surface too strongly so that contaminants do not readily fall off after the magnetic field is removed.

The operating temperatures for the filtration devices typically range from 10 to 200° C., and preferably from 20 to 150° C. The superficial velocity of the process stream passing through the filtration devices typically ranges from 10 to 10,000 v/v/Hr, and preferably from 50 to 5,000 v/v/Hr. The pressure drop across the filtration device is an indicator of its remaining capacity. As the pressure drop reaches between 1 to 10 $Kg/Cm^2$, and preferably between 1 to 5 $Kg/Cm^2$, the filtration device should be removed from the service and cleaned.

In one aspect, the present invention provides a continuous filtration device designed specifically for chemical process streams that contain relatively small amounts of solid matters and active substances that are responsible for generating polymerized sludge or corrosion byproducts. In a preferred embodiment, a novel filtration device is applied to rejuvenate the extraction solvent in the circulation loop of an aromatic extraction process. This continuous filtration device can rejuvenate the contaminated extraction solvent by removing degradation and corrosion products from the solvent stream continuously without interruption thereby achieving high capacity and operation efficiency for the aromatic extraction process. Furthermore, with this filtration device, the workload of the existing, high-cost solvent regenerator is substantially reduced and the level of messy, hazardous solid sludge is substantially reduced as well. A preferred example of the extraction solvent is sulfolane.

One version of the filtration device 100 which is shown in FIGS. 1A and 1B comprises a high-pressure vessel 102 defining a compartment 116 that is sealed from the environment with a removable top cover 104. A supporting tray 108 is positioned within compartment 116 to accommodate a plurality of magnet housings 114. Supporting tray 108 is preferably configured as a rack with a round circumference that matches the contour of compartment 116. Each magnet housing 114 encases a magnetic bar 110 that has been removably inserted therein. Each magnet housing, which serves to isolate magnet bar 110 from direct contact with the contaminated process stream, is configured as a vertically elongated stainless steel tube with a square cross section and the plurality of tubes form a circular arrangement that is held by supporting tray 108. The number of housings 114 and associated magnetic bars 110 employed in filtration device 100 typically ranges from 1 to 30 or more. A spring 106 is positioned between top cover 104 and inner cover 118, which is on the plurality of housing 114, to maintain the position of plurality of housing 114 within compartment 116. A fine mesh screen cylinder 112, which is configured as a basket made from metallic mesh material, is installed in the lower part of compartment 116 and encloses the plurality of magnet housing 114. The plurality of magnet housing 114 fits within the inner perimeter of screen cylinder 112.

In operation contaminated a process stream containing sulfolane solvent, for example, enters filtration device 100 through inlet 130 and the flow of the solvent is channeled initially toward the lower end of compartment 116 so that the contaminated solvent flows through screen cylinder 112 pass the plurality of magnet housing 114 before the treated solvent exits through outlet 132. The degradation and corrosion products are attracted and adhere to the stainless steel tubes of housing 114 with the aid of powerful magnetic bars 110. The removal of the degradation and corrosion products by the magnetic bar is enhanced by the presence of inner screen cylinder 112 that distributes the flow of solvent more evenly over the plurality of magnet housing 114. This enhancement becomes crucial when the level of residual degradation and corrosion products are to be kept to a minimum. The rejuvenated clean extraction solvent can be recycled back to the extraction column.

After being on-stream for a certain period of time, the filtration device becomes loaded with the degradation and corrosion products and the pressure drop across the device increases. The stream is then switched to an auxiliary filtration device that has been installed in a parallel position with the on-stream device. Supporting tray 108 is lifted from compartment 116 along with the plurality of housing 114 that encases magnetic bars 110. Supporting tray 108 is first placed in a container and upon removal of magnetic bars 110 from housing 114, the attracted contaminants simply fall off the surface of housing 114 with the loss of the attractive force. This configuration of the filtration device is characterized by high efficiency for contaminants removal, simple construction and low maintenance costs.

FIGS. 2A and 2B show a modified version of the filtration device that includes magnet housing that is integral with the unit and is not removable therein. Specifically, filtration device 200 comprises a high-pressure vessel 202 that includes a process stream inlet 230 and a process stream outlet 232. Except for the inlet and outlet, compartment 216 of filtration device 200 is enclosed from the environment. A plurality stationary magnet housing 214 configured as vertically elongated stainless steel tubes arranged in a circular fashion within compartment 216. Each magnet housing 214 has an aperture on the sealed surface 204 of filtration device 200 so that housing 214 is as an integral part of the high-pressure vessel. Magnetic bars 210 are placed into magnet housing 214 from the outside.

In operation, after contaminated extraction solvent enters filtration device 200 through inlet 230, the degradation and corrosion products are attracted and adhere to the surfaces of the vertical stainless steel tubes of housing 214 with the aid of powerful magnetic bars 210 and are removed from the solvent. The rejuvenated clean extraction solvent leaves the device through outlet 232 and is recycled back to the extraction column.

When cleaning is required, the contaminated stream is switched to a bypass line that is installed in parallel to filter 200. Magnetic bars 210 are removed from housing 214; upon removal of the magnetic bars, the attracted contaminants fall from outside of the vertical tubes due to the loss of the attractive force. The collected contaminant sludge is flushed from the filtration device with a diluent fluid, such as water or other low value stream. Once the magnetic bars are reinserted into the housing, the cleaned filtration device is for service. This simple design is especially attractive when the contaminants or the process stream is hazardous as it is not necessary to open and disassemble the filtration device or any other process equipment in order to remove the adsorbed contaminants from the device.

As is apparent, the filtration devices depicted in FIGS. 1 and 2 can be designed specifically for any chemical process stream, similar to the sulfolane solvent stream, which contains relatively smaller among of solid matters and active contaminants responsible for generating polymerized sludge or corrosion products.

In another aspect, the present invention provides continuous filtration devices designed specifically for the refinery process streams that contain relatively larger amounts of solid matters, active substances which are responsible for generating polymerized sludge or corrosion products, and/or contaminants which are undesirable to the down-stream process unit. For example, the solid matter in the front-end process streams of refineries usually contains a significant amount of iron rust particulates and other degradation and corrosion products, which tend to accumulate in process lines, valves, and pumps. For these applications, filtration devices with greater filtration capacity, that is, equipped with more and/or larger magnetic bars, are required.

In particular, for filtering dirtier refinery streams that have relatively larger flow rates and higher contaminant levels, magnetic filtration devices with different configurations to handle larger capacity may be required. In a preferred embodiment, the filtration device as shown in FIGS. 3A and 3B is, for example, applied to remove contaminants from straight-run gas oil before it is fed into a hydrodesulfurization (HDS) unit in the refinery. This filtration device can effectively replace the inefficient conventional filter and better protect the sophisticated panel heat exchanger, e.g., PACKINOX heat exchanger, and the catalyst bed of the HDS unit. Both the PACKINOX heat exchanger and the catalyst bed are vulnerable to plugging by iron rust and other paramagnetic particulates. Filtration device 300 cleans the gas oil by continuously removing iron rust particulates and other corrosion products from the stream. Thus a high capacity and operation efficiency of the PACKINOX heat exchanger and the HDS unit are maintained. As illustrated, filtration device 300 comprises a high-pressure vessel 302 with a removable cover 304 that is equipped with handle 306, and a square or rectangular rack-shaped supporting tray 308 with magnet housing 314 in the form of vertically elongated stainless steel square tubes fitted within compartment 316 of high pressure vessel 302. The stainless steel square tubes are preferably arranged in rows in a square or a rectangular matrix to increase the total contact area of the tubes for maximum solid loading. A magnetic bar 310 is placed in each stainless steel tube. To enhance the flow pattern of a process stream over the tubes, vertical partition plates 320 are placed between each row of the tubes to create a tortuous flow pattern pass the tubes. The number of housings 314 and associated magnetic bars 310 employed in filtration device 300 typically ranges from 1 to 100 or more.

As the contaminated gas oil enters inlet 330 which is located in the lower part of one side of filtration device 300, iron rust particulates and corrosion products are attracted and adhere to the outer surfaces of the vertical square stainless steel tubes aided by the powerful magnetic bars. The treated cleaned gas oil stream exits through outlet 332 that is located at the upper part on the side opposite inlet 330. The removal of the iron rust particulates and corrosion products by the magnetic bars is optimized by packing the maximum number of square tubes in the matrix and positioning of the vertical partition plates. This arrangement keeps the level of residual iron rust particulates and corrosion products to a minimum. The filtration device yields substantially cleaned gas oil that is fed to the PACKINOX heat exchanger and the HDS unit.

Once the process stream is diverted to an auxiliary filtration device as described above, remove the square or rectangular tray along with the stainless steel tubes and the magnetic bars. The tray supporting the plurality of housing and magnetic bars is removed; the attracted contaminants fall from the vertical tubes upon removal of the magnets therefrom.

FIGS. 4A and 4B depict a modified version of the filtration device that includes magnet housing that is integral with the unit and is not removable therein. Specifically, filtration device 400 comprises a high-pressure vessel 402 with a plurality of magnet housing 414 in the form of stationary vertically elongated square stainless steel tubes arranged in rows of a square or rectangle matrix. The tubes are an integral part of the high-pressure vessel. A magnetic bar 410 is placed inside each square stainless steel tube through an orifice on upper sealed surface of pressure-vessel 402. Vertical partition plates 420 are placed between each row of the tubes to optimize flow pattern through compartment 416.

Operation of this filtration device is the same as that for the filtration device shown in FIGS. 3A and 3B however once filtration device 400 is taken off-line, the magnetic bars are simply lifted out of their stainless steel tube housing whereupon the contaminants fall off into compartment 416. The adsorbed contaminant sludge is flushed away.

FIGS. 5A, 5B, and 5C illustrate another filtration device that is particularly suited for removing contaminants from refinery streams, such as the straight-run gas oil before it enters a HDS unit, and thereby maintain the high capacity and operation efficiency of the down-stream PACKINOX heat exchanger and the HDS unit.

As shown, filtration device 500 comprises a high-pressure vessel 502 sealed with a removable cover 504 that is equipped with handle 506, and a square or rectangular-shaped rack supporting tray 508 to which a plurality of magnet housing 514 in the form of vertically elongated stainless steel column or slates are attached and fitted in compartment 516 of high pressure vessel 502. The stainless steel slates are arranged in parallel rows to increase the total contact surface area of the device for maximum solid loading. The space between adjacent parallel rows of slates defines a channel through which the contaminated gas oil flow. A magnetic plate 510 is placed inside of each stainless steel slate. The number of housings 514 and associated magnetic bars 510 employed in filtration device 500 typically ranges from 1 to 100 or more.

As shown in FIG. 5C, contaminated gas oil enters filtration device 502 through inlets 530 located at the lower part on the front side of the device. The iron rust particulates and corrosion products are attracted and adhere to the outside surface of the vertical stainless steel slates with the aid of the powerful magnetic plates. The cleaned gas oil stream exits through an outlet 532 located in the upper part of backside of the device. In this fashion, inlets 530 and outlets 532 define flow patterns that are parallel to the channels between adjacent slates. Moreover, the employment of multiple inlets better distributes the process stream flow so as to maximize the contact time between the process stream and slates.

Once filtration device 500 is taken off-line, supporting tray 508 is lifted from compartment 516 and once the magnetic plates are removed from their corresponding stainless steel slates, the contaminants will fall off.

Finally, FIGS. 6A, 6B and 6C depict a modified version of the filtration device that includes magnet housing that is integral with the unit and is not removable therein. Specifically, filtration device 600 comprises a high-pressure vessel 602 that defines compartment 616 into which are positioned a plurality of magnet housing 614 in the form of stationary vertically elongated stainless steel column or slates that are arranged in parallel across compartment 616. The slates are an integral part of the high-pressure vessel. Except for the process stream inlets 630 and outlet 632, compartment 616 is sealed from the environment. A vertical magnetic plate 610 is placed into each of magnet housing 614 through an aperture on sealed top 622 of pressure-vessel 602.

Operation of filtration device 600 is similar to that shown in FIGS. 5A, 5B and 5C however once filtration device 600 is taken off-line, the magnetic plates are simply lifted out of their stainless steel slate housings whereupon the contaminants fall off into compartment 616. The adsorbed contaminant sludge is flushed away.

It is expected that the filtration devices illustrated in FIGS. 3, 4, 5, and 6 will perform at such high levels that the filtered gas oil will be sufficiently free of particulates that the expensive PACKINOX heat exchanger can be replaced by a conventional, low cost tube and shell heat exchanger.

Filtration devices of the present invention can be adapted for implementation to any refining process stream, similar to the straight-run gas oil stream, which contains relatively large among of iron rust particulates, corrosive products, and/or contaminants, which are undesirable to the down-stream process unit. In preferred embodiments, the filtration devices of this invention can be advantageously applied to following refinery streams: (1) feed to the $C_5$ and $C_6$ isomerization unit, (2) feed to the naphtha HDS unit, (3) feed to the reformer HDS unit, (4) feed to the kerosene HDS unit, (5) feed to the coke naphtha HDS unit, (6) feed to residual oil HDS unit, and (7) feed to coal tar naphtha HDS unit.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in these embodiments by workers skilled in the art without departing from the scope of the present invention as defined by the following claims.

What is claimed is:

1. A process for online removal of contaminants including polar polymeric contaminants from a process stream that comprises the steps of:
   (a) providing a filtration apparatus that comprises:
      a vessel that has a compartment and an inlet for the process stream and an outlet for a treated process stream; and
      a plurality of magnets that are removably encased in a plurality of elongated housings that are positioned within the compartment wherein the housings have square or rectangular cross sections, and
      a plurality of partition plates within the compartment;
   (b) introducing a process stream into the vessel through the inlet so that polar polymeric sludge contaminants become adhered to exterior surfaces of the plurality of housings to thereby yield a treated process stream that exits through the outlet wherein the process stream flows through a path that is defined by the plurality of partition plates before exiting through the outlet;
   (c) switching the process stream through a bypass line that is operating in parallel with the filtration apparatus when pressure across the vessel reaches a threshold pressure difference;
   (d) removing the polar polymeric sludge contaminants from the compartment by (i) raising the plurality of magnets from the plurality of housings thereby releasing the contaminants into the compartment and flushing the contaminants from the compartment or (ii) lifting the plurality of housings from the compartment; and
   (e) switching the process stream from the bypass line to the filtration apparatus.

2. The process of claim 1 wherein step (d) comprises raising the plurality of magnets from the plurality of housings; and the process comprises the step of placing at least one magnet into the plurality of housings before step (e).

3. The process of claim 1 wherein the plurality of housings are secured to a support tray and step (d) comprises removing the support tray from the compartment and then placing a support tray that secures a plurality of housings encasing a plurality of magnets therein into the compartment before step (e).

4. The process of claim 1 wherein step (c) comprises switching the process stream when the pressure difference across the vessel reaches 1 to 5 kg/cm$^2$.

5. The process of claim 1 wherein the contaminants include polymeric sludge which is paramagnetic.

6. The process of claim 1 wherein the process stream that is introduced into the vessel through the inlet in step (b) is a refinery stream and the treated process stream that exits through the outlet is fed into a process unit that is selected from the group consisting of (1) a $C_5$ and $C_6$ isomerization unit, (2) naphtha hydrodesulfurization (HDS) unit, (3) reformer HDS unit, (4) kerosene HDS unit, (5) coke naphtha HDS unit, (6) residual oil HDS unit, and (7) coal tar naphtha HDS unit.

7. The process of claim 1 wherein the process stream that is introduced into the vessel through the inlet in step (b) is a gas-oil stream.

8. The process of claim 1 wherein the filtration apparatus further includes an inner screen cylinder that is positioned in the compartment such that the plurality of housings fit within an inner perimeter of the screen cylinder which encloses at least lower ends of the plurality of housings and wherein in step (b) the process stream flows through the screen cylinder before contacting the plurality of housings.

9. A process for online removal of contaminants including polar polymeric contaminants from a process stream that comprises the steps of:
   (a) providing a filtration apparatus that comprises:
      a vessel that has a compartment and an inlet for the process stream and an outlet for a treated process stream; and
      a plurality of magnets that are removably encased in a plurality of elongated housings that are positioned within the compartment wherein the housings have square or rectangular cross sections and wherein the plurality of elongated housings comprise a plurality of vertically elongated slates which are arranged in parallel rows which define channels:
   (b) introducing a process stream into the vessel through the inlet wherein the process stream flows through the channels and polar polymeric sludge contaminants become adhered to exterior surfaces of the plurality of housings to thereby yield a treated process stream that exits through the outlet;
   (c) switching the process stream through a bypass line that is operating in parallel with the filtration apparatus when pressure across the vessel reaches a threshold pressure difference;
   (d) removing the polar polymeric sludge contaminants from the compartment by (i) raising the plurality of magnets from the plurality of housings thereby releasing the contaminants into the compartment and flushing the contaminants from the compartment or (ii) lifting the plurality of housings from the compartment; and
   (e) switching the process stream from the bypass line to the filtration apparatus.

10. The process of claim 9 wherein step (d) comprises raising the plurality of magnets from the plurality of housings; and the process comprises the step of placing at least one magnet into the plurality of housings before step (e).

11. The process of claim 9 wherein the plurality of housings are secured to a support tray and step (d) comprises removing the support tray from the compartment and then placing a support tray that secures a plurality of housings encasing a plurality of magnets therein into the compartment before step (e).

12. The process of claim 9 wherein step (c) comprises switching the process stream when the pressure difference across the vessel reaches 1 to 5 $kg/cm^2$.

13. The process of claim 9 wherein the contaminants include polymeric sludge which is paramagnetic.

14. The process of claim 9 wherein the process stream that is introduced into the vessel through the inlet in step (h) is a refinery stream and the treated process stream that exits through the outlet is fed into a process unit that is selected from the group consisting of (1) a $C_5$ and $C_6$ isomerization unit, (2) naphtha hydrodesulfurization (HDS) unit, (3) reformer HDS unit, (4) kerosene HDS unit, (5) coke naphtha HDS unit, (6) residual oil HDS unit, and (7) coal tar naphtha HDS unit.

15. The process of claim 9 wherein the process stream that is introduced into the vessel through the inlet in step (b) is a gas-oil stream.

16. The process of claim 9 wherein the filtration apparatus further includes an inner screen cylinder that is positioned in the compartment such that the plurality of housings fit within an inner perimeter of the screen cylinder which encloses at least lower ends of the plurality of housings and wherein in step (b) the process stream flows through the screen cylinder before contacting the plurality of housings.

* * * * *